Jan. 17, 1967   R. A. NEAVERSON ETAL   3,298,705
WHEELED TROLLEYS

Filed March 27, 1964                              2 Sheets-Sheet 1

Inventors:
Rowland Alec Neaverson
Peter Anthony Neaverson

By: Nolte & Nolte
Attorneys

Inventors:
Rowland Alec Neaverson
Peter Anthony Neaverson
By Nolte & Nolte
Attorneys United States Patent Office 3,298,705
Patented Jan. 17, 1967

1

3,298,705
WHEELED TROLLEYS
Rowland Alec Neaverson, 49 Westfield Road, Leicester,
England, and Peter Anthony Neaverson, 88 Curzon
Ave., Birstall, Leicester, England
Filed Mar. 27, 1964, Ser. No. 355,322
Claims priority, application Great Britain, Mar. 28, 1963,
12,384/63
3 Claims. (Cl. 280—46)

This invention is concerned with improvements in wheeled jacking trolleys particularly of the kind used for manoeuvering trucks, stillages and containers hereinafter referred to for convenience as trucks.

A typical truck with which the trolley of this invention may be used comprises a load carrying platform, a pair of ground engaging wheels, ground engaging means for supporting and preventing movement of the truck until required and means which may be elongated by a jacking trolley to raise the truck and allow its movement. The invention will be described with reference to the application to such a truck. Known jacking trolleys comprise a handle, and a body portion having one or more wheels (generally two) on a common axis and a load engaging member on said body portion such that the trolley constitutes a lever having its fulcrum at the common axis of the wheels.

With such an arrangement the load engaging member of the trolley is engaged with co-operating means on a truck and the handle pivoted to raise the ground engaging means of the truck to allow the truck to be moved. It will be appreciated that the extent to which the truck may be raised is limited by the extent to which the trolley may be pivoted and the relative positions of the axis of the wheels of the trolley and the load engaging means thereof. Such an arrangement suffers from the disadvantage that is difficult to negotiate uneveness in the ground surface or steps.

In accordance with the invention there is provided a jacking trolley comprising a body portion, load engaging means, at least one ground engaging wheel on said body portion and a handle extending from the body portion in a direction away from the ground engaging wheel, the arrangement being such that the trolley can be mainpulated to cause the load engaging means to engage and lift a load by pivotal jacking movement about the axis of the ground engaging wheel to raise a load whilst the handle is at the same general level as the load engaging means on the trolley. By this provision a jacking trolley is provided by means of which a truck can be manoeuvred while positioned at a level above a floor or ground on which the operator is standing for example at the raised level of a loading dock or the floor of a vehicle. Conveniently the trolley has means for adjustment whereby jacking can be effected either with the handle at the level above specified or alternatively with the handle extending upward substantially above the level of the load engaging means. The trolley is thereby permitted to be used for a dual function firstly to manipulate a truck resting on the floor on which the operator stands and secondly at a higher level above the operator's feet after the truck has been lifted to the higher level.

The adjustment just referred to may be provided by having the load engaging means carried on a part which is adjustable between two positions in either of which it is capable of being set. There may be two load engaging means on the trolley spaced apart from one another in a direction transversely of the axis of the ground engaging wheel of the trolley.

The invention includes a jacking trolley having a handle, a body portion of elongated form, at least one ground engaging wheel on said body portion at one end thereof, a handle extending from the opposite end of the body portion substantially in line therewith and two load engaging means carried by said body portion and so arranged that one can be used to jack a load whilst the handle and the body portion are in an approximately horizontal attitude and the other can be used to jack a load whilst the body portion and handle are canted upwardly.

The trolley may be provided with an additional wheel carried by the body portion and movable into and out of ground engaging attitude at a position displaced from the axis of the first mentioned wheel, to increase stability when a load is raised with the handle at the level of the load engaging means. When two load engaging means are provided they may be mounted on a part which is pivoted to the body portion and movable between two alternative settings.

When two load engaging means are provided on the trolley one of them may be adapted to provide for obtaining a high lift of the truck and the other to provide for obtaining a lower lift.

A particular embodiment of the invention is illustrated by way of example in the accompanying drawings and will now be described with reference to the drawings in which.

Figure 3:
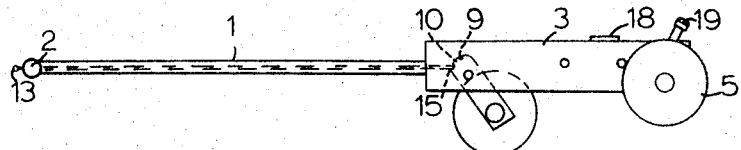
Figure 4:
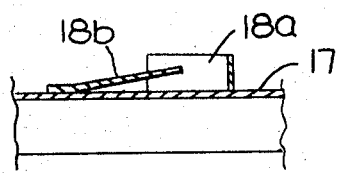
Figure 5:
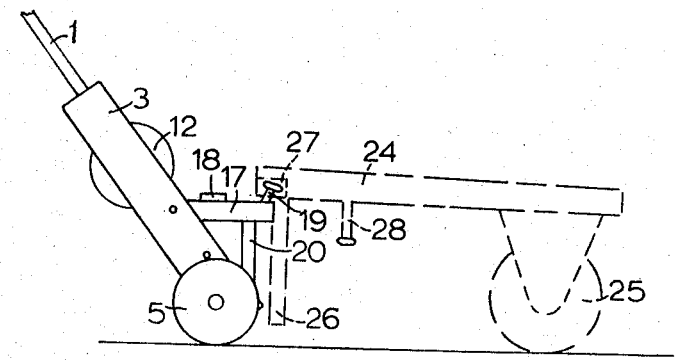
Figure 6:
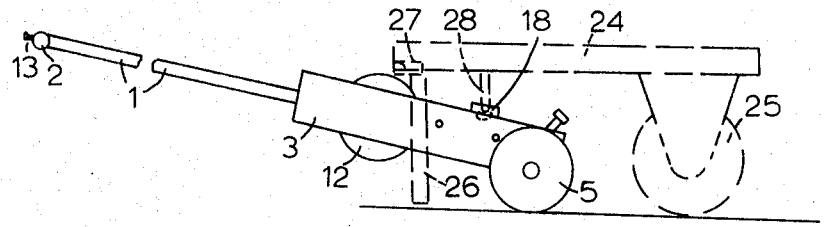
Figure 7:
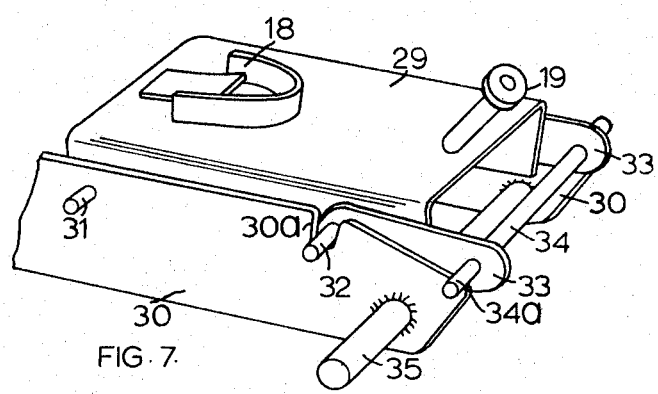

FIGURE 3 is a side view of the trolley with an additional wheel in ground engaging position, FIGURE 4 is an enlarged detail sectional and somewhat diagrammatic view of a load engaging means, FIGURE 5 shows, in side view, the trolley in operation as applied to a truck, FIGURE 6 is a view similar to FIG. 5 but with the trolley in a different setting, and FIGURE 7 is a fragmentary perspective view of part of a modified trolley.

The trolley shown in the drawings has a handle rod 1 with a crossbar handle 2 to be grasped by the hand and a body portion 3 to which the handle rod is connected. The body portion 3 has an axle 4 mounted thereon, on which are mounted a pair of ground engaging wheels 5, one at each side of the trolley at one end.

Pivotally connected to the body member 3, by means of a cross pin 16, is an angled plate 17 having mounted thereon load engaging means 18 and 19. Side pieces of the plate 17 are provided with notches 21 for engagement with a rod 22 which locates the plate 17 in one of two extreme positions. Carried within the sides of plate 17 are a pair of members 20, which are themselves pivotally connected to plate 17 and which when the plate 17 is pivoted about pin 16, may be engaged upon a cross bar 23 to locate said plate 17 in its other extreme position shown in FIG. 5.

The truck engaging means 18 is in the shape of a socket formed by a U shaped plate 18a located on the member 17 having a ramp 18b leading to the bottom of the U to present a socket, see particularly FIG. 4. The means 19 is a simple boss.

Pivotally connected to the body portion, by means of pin 6, is a yoke 7 provided with a crossbar 8 having a part of arcuate cross-section and a pair of holes or recesses 9 and 10 formed therein, (see FIG. 3). Pivotally mounted between the two side flanges of the yoke 7 is an axle 11 carrying a wheel 12.

Located within the handle rod 1 of the trolley is a locking rod 14 having a handle 13 connected thereto beyond the crossbar handle 2. A spring (not shown) biasing the rod 14 to move towards the body portion. The locking rod 14 extends through the handle rod and thence through a hole in the end of the body portion 3. Inside of the body portion, the end of the rod 14 engages a recess or hole 9 in the crossbar 8 of the yoke 7 to hold the yoke in the position illustrated in FIGS. 1, 5 and 6 with the wheel 12 centered in the body portion 3. The locking rod may be retracted by pulling the handle 13 away from the crossbar handle 2, thus withdrawing the inner end of the rod from the recess or hole 9 and permitting the yoke 7 to be moved about the pin 6 until it assumes the position illustrated in FIG. 3 with the wheel 12 projecting well below the body portion. With the yoke in this position the handle 13 may be released, permitting the inner end of the locking rod 14 to engage a second recess or hole 10 in the crossbar 8, arcuately displaced from the recess or hole 9, to lock the yoke in the described position.

Referring now to FIGS. 5 and 6 a truck 24 is shown having legs 26 and wheels 25. The truck has at its underside a socket 27 and a boss 28 for co-operation with the boss 19 and socket 18 of the body portion of the trolley, respectively. The socket 27 is of similar construction to the socket 18 but in an inverted attitude as compared thereto.

To obtain a high lift of the truck the boss 19 of the trolley is engaged in socket 27 of the truck when the member 17 is in the position thereof shown in FIG. 5.

In the position shown in FIG. 5, the load of the object lifted is transmitted from angled plate 17 to the body portion 3 by means of members 20, which are engaged upon cross-bar 23, which in turn is connected to body portion 3. Members 20 pivotably slide in connection to angled plate 17, although not shown in the drawings. In this position the handle of the trolley extends upwardly from the truck to facilitate handling of the truck upon the ground without an operative having to stoop. Also the truck and the legs 26 thereof may be raised to a considerable extent above the ground to allow steps or the like obstacles to be negotiated.

Figure 1:
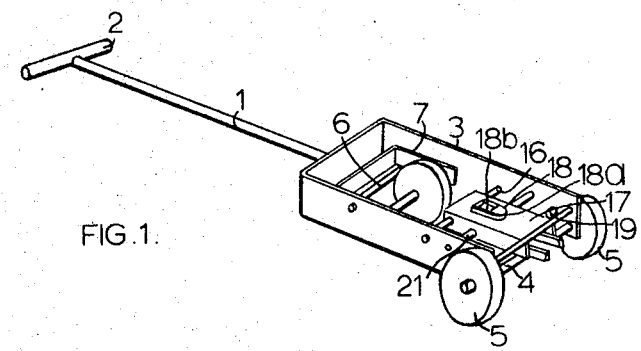
FIGURE 1 is a perspective view of a trolley according to this invention.
Figure 2:
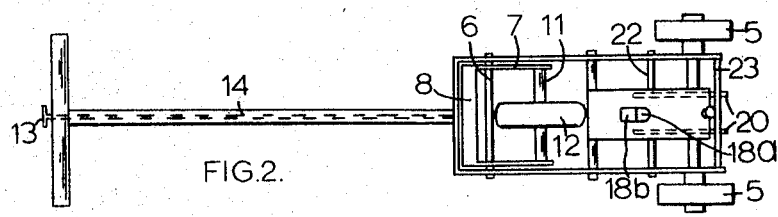
FIGURE 2 is a plan view of the trolley of FIG. 1.

In the setting of the parts shown in FIG. 1 the trolley can be run underneath the truck 24, FIG. 6, from the end of the truck having the legs 26, until ramp 18b of the load engaging means 18 is directly under the downwardly projecting spigot 28 of the truck, at which point the trolley is raised to bring ramp 18b in contact with spigot 28 and then by slight movement of the trolley away from the truck, spigot 28 is thereby caused to slide along ramp 18b until engaging the socket formed by the U-shaped plate 18a located on angled plate 17. The spigot 28 of the truck then becomes firmly engaged between the ramp 18b and the U-shaped plate 18a on the trolley. Raising of the handle 2 to a small extent will then cause the legs 26 of the truck to be raised slightly from the floor (as shown in FIG. 6), so that the trolley together with the truck can be trundled as required with the handle rod 1 and handle 2 at low level and approximately the level of the load engaging means. The trolley in this setting is particularly adapted for manipulation of a truck positioned at a level above the ground on which the operator is standing, for example on the platform of a loading dock or on the raised floor of a vehicle, the elevation of which is higher than the elevation of the platform on which the operator stands. To facilitate handling in this position, the wheel 12 can be lowered to the position shown in FIG. 3 by pulling handle 13 away from crossbar handle 2, thereby removing locking rod 14 from recess or hole 9, and then permitting wheel 12 and its holder to drop until locking rod 14 is aligned with the second recess or hole 10. Thereupon by pushing handle 13 toward crossbar handle 2, rod 14 becomes engaged with the second recess or hole 10 and locks the trolley in the position shown in FIG. 3. The wheel 12 can slide laterally on its axle 11 as required and the trolley thus assumes a stable raised position in which the truck 24 can be manouvred quite easily to any place required.

Reversal of the setting of the yoke 7 to return it to the setting of FIG. 1 is effected by pulling on the handle 13 to release engagement between rod 14 and recess 10, lowering the body portion 3 to raise the wheel 12 between its sides and releasing handle 13 to cause rod 14 to engage in the recess or hole 9.

The legs of the truck may act as brakes to control the trolley and truck by causing them to engage the ground by lowering the trolley.

In the modified construction shown in fragmentary view in FIG. 7, the flanged plate 17 is replaced by a similar part 29 which substantially fills the space between sides 30 of a modified body part and is pivoted on a spindle 31 corresponding to cross pin 16. The member 29 carries the load engaging members 18 and 19 as before. From the opposite sides of member 29 there project aligned pins 32 on which there is pivoted a stirrup member comprising strut arms 33 and a rod 34 extending through them and having projecting ends 34a. In the lowered position of member 29 the pins 32 engage in notches 30a in the upper edges of the sides 30. When the member 29 is raised the projecting ends 34a of the rod 34 ride up slant edges 30b of the sides and into the notches 30a so that the arms 33 then form struts to hold the member 29 raised so that the trolley may be used in the manner shown in FIG. 5. The sides 30 are braced apart by an axle 35 projecting ends 35a of which form mountings for ground engaging wheels such as the wheels 5.

It will be appreciated that the features of this invention described herein are subject to modification and adaption and that the particular embodiments described have been chosen merely for the purposes of illustration.

It will be appreciated that the sockets and bosses of the trolley and truck may be changed so that there are say two bosses on the trolley and two sockets on the truck. Furthermore means other than sockets and bosses may be provided.

What we claim is:

1. A jacking trolley comprising a body portion, at least one ground engaging wheel on the body portion at one end thereof, a handle fixed to the body portion to extend away from its opposite end, a carrier, means pivoting the carrier to the body portion about a transverse axis at a position between the ends of the body portion, two load engaging means mounted on the carrier and spaced apart along the latter, and each adapted for pivotal engagement with a load permitting relative turning movement between the trolley and the load about an upstanding pivotal axis, and means for locating the carrier in two alternative settings angularly displaced about its axis of pivoting, in which settings the respective load engaging means are adapted to engage and jack up a load with the ground engaging wheel serving as a fulcrum in each case and with the handle in an upwardly extending attitude in one case and a substantially horizontally extending attitude in the other case.

2. A jacking trolley according to claim 1 having two ground engaging wheels at the first said end of the body portion one at each side thereof and having a third ground engaging wheel positioned towards the other end of the body portion, a yoke pivotally mounted on the body portion and supporting the third ground engaging wheel for movement between operative and inoperative settings, a transverse spindle mounted in the yoke on which the third ground engaging wheel can rotate and also move laterally with respect to the body portion, and latching means to retain the yoke in said settings.

3. A jacking trolley according to claim 1 in combination with an associated truck having ground engaging wheels at one end and fixed legs at its opposite end, and longitudinally spaced means on its underside for interengagement with the respective load engaging means on the trolley, said longitudinally spaced means being positioned towards the end of the truck having the legs.

References Cited by the Examiner

UNITED STATES PATENTS

| | | | |
|---|---|---|---|
| 385,181 | 6/1888 | Huntly | 254—8.2 |
| 1,116,295 | 11/1914 | Kleckner | 280—43 |
| 1,195,233 | 8/1916 | Kollner | 254—2.2 X |
| 1,367,673 | 2/1921 | Smith | 280—46 |
| 1,434,572 | 11/1922 | Turner | 280—46 |
| 2,629,583 | 2/1953 | Mueller | 254—8.4 |
| 2,768,835 | 10/1956 | Hull | 280—43.24 |
| 2,915,318 | 12/1959 | Chesser | 280—43 |

FOREIGN PATENTS

| | | |
|---|---|---|
| 1,046,749 | 12/1953 | France. |
| 276,451 | 7/1930 | Italy. |

BENJAMIN HERSH, *Primary Examiner.*

LEO FRIAGLIA, *Examiner.*

C. C. PARSONS, *Assistant Examiner.*